(12) United States Patent
Lafon

(10) Patent No.: US 6,205,194 B1
(45) Date of Patent: Mar. 20, 2001

(54) DEVICE FOR COMMUNICATING WITH A PORTABLE DATA MEDIUM

(75) Inventor: Jean-Pierre Lafon, Chatillon (FR)

(73) Assignee: CP8 Transac, Louveciennes (FR)

( * ) Notice: Subject to any disclaimer, the term of this patent is extended or adjusted under 35 U.S.C. 154(b) by 0 days.

(21) Appl. No.: 09/029,193

(22) PCT Filed: Jun. 26, 1997

(86) PCT No.: PCT/FR97/01141
§ 371 Date: Feb. 25, 1998
§ 102(e) Date: Feb. 25, 1998

(87) PCT Pub. No.: WO98/00772
PCT Pub. Date: Jan. 8, 1998

(30) Foreign Application Priority Data
Jul. 1, 1996 (FR) .................................................. 96 08179

(51) Int. Cl.⁷ .................................................. H04L 23/00
(52) U.S. Cl. .................................................. 375/377
(58) Field of Search .......................... 375/377; 702/187; 713/2

(56) References Cited

U.S. PATENT DOCUMENTS 5,379,435 * 1/1995 Hanaoka .................................. 713/2
5,408,421 * 4/1995 Prest et al. ............................ 702/187

* cited by examiner

Primary Examiner—Don N. Vo
(74) Attorney, Agent, or Firm—Miles & Stockbridge P.C.; Edwards J. Kondracki

(57) ABSTRACT

A device for communicating with a portable data medium using at least a power signal (AL) supplied by an electric energy source (4), a control signal (SC1) and a data transmission signal (I/O), comprises an interrupter (5) for interrupting the power signal (AL) to the medium from the source if the portable data medium does not cooperate with the device (1), means (8) for storing electric energy received from the source and for supplying the power signal to the medium when the source does not supply power and a data processor (3) arranged to ensure transmission of the power, control and data transmission signals (AL, SC1, I/O) to the medium according to a predetermined sequencing, as well as for detecting the interruption of the power signal (AL) from the source, then for triggering the interruption of the control and data transmission signals (SC1, I/O) according to the predetermined sequencing during the supply of the power signal from the energy storage mean.

3 Claims, 2 Drawing Sheets

DEVICE FOR COMMUNICATING WITH A PORTABLE DATA MEDIUM

BACKGROUND OF THE INVENTION

1. Field of the Invention

The invention relates to a device for communicating with a portable data medium in a communication using at least a power signal supplied by an electric energy source, a control signal and a data transmission signal.

2. Description of Related Art

Typically, the portable data medium can be a chip card incorporating a microprocessor or microwired logic circuits defining areas to which access is controlled and thus capable of containing secret information such as cryptographic keys (see for example the portable object described in U.S. Pat. No. 4,211,919).

The object of the invention is to offer an original solution for solving the general problem of the sequencing of the signals, particularly so as to comply with the standards applicable in this case (for example ISO standard 7816-3). It makes it possible, in a simple way, to meet the contradictory requirements of detecting the interruption of the power signal if the portable data medium is removed, and of continuing to supply this signal to the portable data medium for a given time after this detection.

SUMMARY OF THE INVENTION

For this purpose, the device according to the invention comprises: interrupting means disposed between the electric energy source and the portable data medium and controlled by the latter so that they interrupt the supply of the power signal to the portable data medium from the electric energy source if the portable data medium is not cooperating with the device and so that they allow this supply if the portable data medium is cooperating with the device;

energy storage means designed to store the electric energy received from the electric energy source, connected to a power supply input of the portable data medium so as to supply this power signal to the latter for a predetermined time following an interruption of this supply of the power signal from the electric energy source;

data processing means designed to ensure transmission to the portable data medium of the signals according to a predetermined sequencing, and to interrupt this transmission according to a predetermined sequencing, as well as to detect the interruption of the supply of the power signal from the electric energy source, then trigger the interruption of the other signals according to this predetermined sequencing while the power signal is supplied from the energy storage means.

BRIEF DESCRIPTION OF THE DRAWINGS

Other details and advantages of the invention appear in the following description of several preferred but non-limiting embodiments, in reference to the appended drawings, in which:

FIG. 1 shows a device 1 intended to cooperate with a portable data medium 2. The device 1 comprises data processing means 3 in the form of a microprocessor or microwired logic circuits, including means for storing the data. These data processing means 3 comprise means designed to manage communication with the portable data medium 2, and particularly to control a plurality of signals, indicated below, used to conduct this communication in such a way that the latter appear and disappear according to a predetermined sequencing, in accordance with any standard that may be applicable. In the case of a microprocessor, these means comprise a specific program. In the case of microwired logic circuits, they comprise specific microwired logic circuits.

Figure 1:
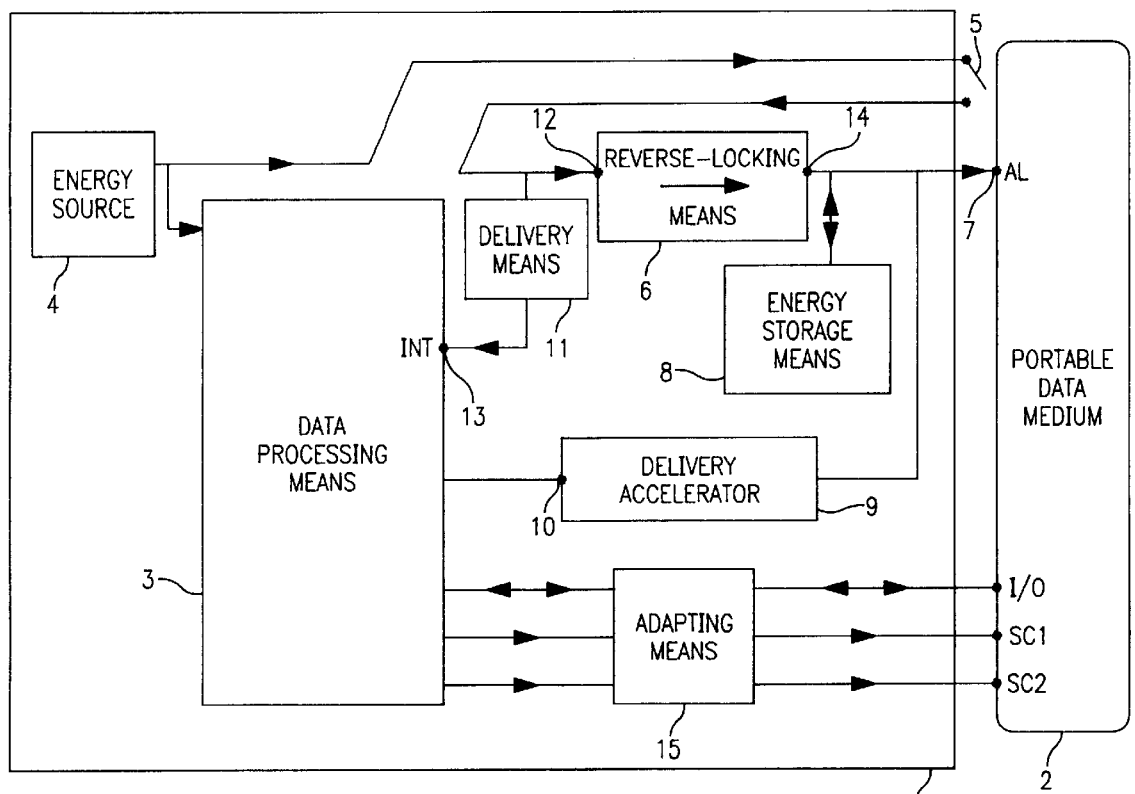
FIG. 1 is a schematic diagram of the device according to the invention.

The device 1 also comprises an electric energy source 4 connected to data processing means 3 and to the portable data medium 2 through a portable data medium presence switch 5 connected in series with reverse-locking means 6. These reverse-locking means 6 are connected to a power supply input 7 of the portable data medium 2 intended to receive a power signal AL. The electric energy source 4 can for example comprise a voltage source constituted by an electric generator such as a battery, a photovoltaic cell, or a very high-capacity capacitor. In a less preferred variant of embodiment, the electric energy source 4 is outside the device 1.

The medium presence switch 5 is such that it closes when the portable data medium 2 is inserted into a connector equipping the device 1 and designed to receive the portable data medium 2. The device 1 also comprises energy storage means 8 connected to an output 14 of the reverse-locking means 6 and designed to store the electric energy received from the electric energy source 4. The reverse-locking means 6 are designed to prevent a return of electric energy from the energy storage means 8 to the delivery means 11. They comprise for example a diode, a transistor, or a regulating circuit designed to carry out this function.

DESCRIPTION OF THE PREFERRED EMBODIMENTS

The device 1 also comprises a delivery accelerator 9 connected at one end to energy storage means 8, and comprising on the other end a terminal 10 through which it is connected to the data processing means 3. The delivery accelerator 9 is designed to draw on the energy storage means 8 for the flow of electric energy, while being controlled by the data processing means 3. It comprises for example a resistor, a transistor or combination of transistors, or a logic gate.

The above-mentioned delivery means 11 comprise an input connected to an input 12 of the reverse-locking means 6 through which the latter is itself connected to the medium presence switch 5, and an output which drives an interrupting input 13 of the data processing means 3. These means are designed to instantaneously deliver the electric energy present in the terminal 12 when the medium presence switch 5 is opened, so that the data processing means 3 detects this opening. They comprise for example one or more resistors, or one or more transistors. These delivery means 11 are only necessary in cases where, in practice, a zero capacity cannot be obtained in the terminal 12 due to the components used, and where it is consequently necessary to deliver this capacity.

The reverse-locking means 6, like the delivery means 11, can be replaced by any other means for detecting the stopping of the supply of the power signal AL from the electric energy source 4 located at any place in the device 1 that will enable it to achieve this detection. These means can be zero current measuring means between the electric energy source 4 and the energy storage means 8, for example using optical or inductive means.

The device 1 also preferably comprises adapting means 15 for supplying the portable data medium 2 with the control signals SC1 and SC2, and for exchanging with it a data transmission signal I/O. These adapting means 15 are intended to use these signals in accordance with any standard that may be applicable.

Naturally, the various means of the device 1 defined above could be physically located on the same, single component having a microprocessor or microwired logic circuits, and not necessarily on separate components.

In operation, when the portable data medium 2 is inserted into the device 1, the medium presence switch 5 closes, causing the following effects:

the input 12 of the reverse-locking means 6 goes from a low level of electric energy to a high level of electric energy;

the delivery means 11 feed back to the input 13 of the data processing means 3 this high level of electric energy, thus informing it that the portable data medium 2 has been inserted and that it is necessary to start a procedure for communicating with it;

the energy storage means 8 are charged;

the portable data medium 2 receives, through its power supply input 7, the electric energy that allows it to operate;

the delivery accelerator 9 is maintained in the inactive position by the data processing means 3, which act on the terminal 10;

the data processing means 3 are designed to cause the appearance of the signals I/O, SC1, SC2 according to a predetermined sequencing, in accordance with any standard that may be applicable.

The device 1 and the portable data medium 2 are then ready to run a dialogue procedure.

When the portable data medium 2 is subsequently extracted from the device 1, the medium presence switch 5 opens, causing the following effects:

the input 12 of the reverse-locking means 6 goes from a high level of electric energy to a low level of electric energy;

the delivery means 11 feed back to the input 13 of the data processing means 3 this low level of electric energy, which is detected by the data processing means 3, which interrupt any processing operation in progress to trigger a suppression of the signals I/O, SC1, SC2 according to a predetermined sequencing, in accordance with the applicable standard;

next, the delivery accelerator 9 controlled by the data processing means 3 through its terminal 10, discharges the energy storage means 8, which has the effect of bringing the electric energy available at the power supply input 7 of the portable data medium 2 to zero, in order to prepare for its disconnection from the device 1.

Figure 2:
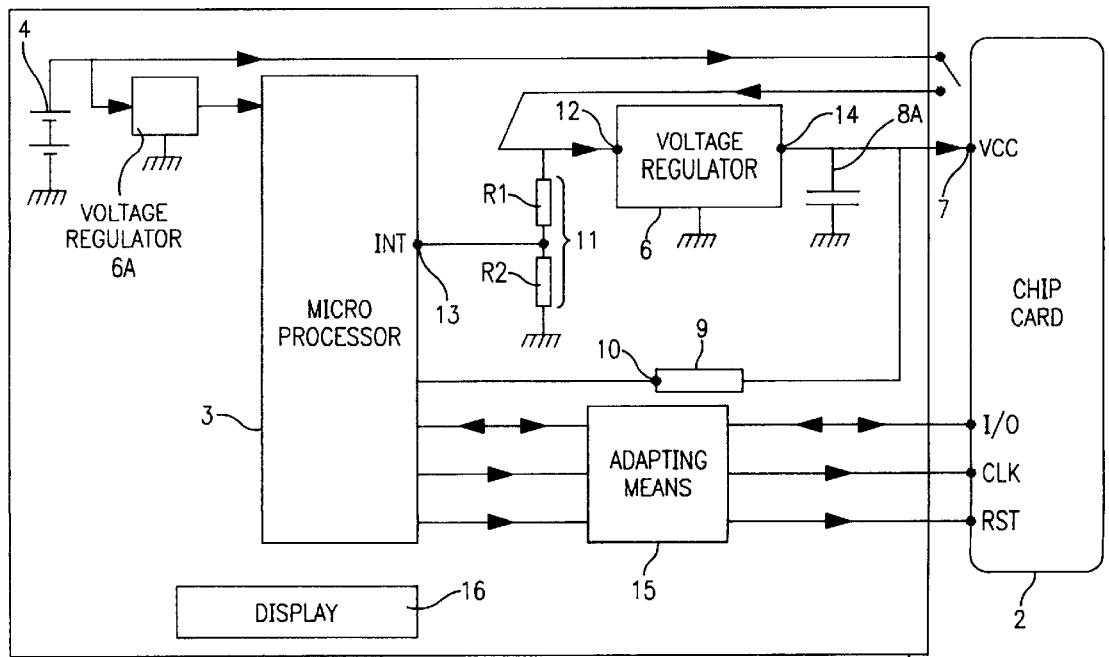
FIG. 2 is the diagram of a preferred embodiment of the device according to the invention.

In FIG. 2, the elements that are homologous to those in FIG. 1 have the same references. The data processing means 3 comprise a microprocessor, the electric energy source 4 comprises two batteries connected in series, and the delivery means 11 comprise two resistors R1, R2 connected in series between the terminal 12 of the voltage regulator 6 and a ground of the device 1, a common point of these resistors being connected to the terminal 13 of the microprocessor. The reverse-locking means 6 comprise a linear voltage regulator or "low drop out" regulator having the property of supplying a slight voltage drop on output; an identical voltage regulator 6A is interposed between the electric energy source 4 and the microprocessor 3.

The energy storage means (8) comprises a capacitor 8A connected between the terminal 14 of the voltage regulator and the ground. The delivery accelerator comprises a resistor 9 connected between the terminal 14 and the microprocessor.

The power signal AL is represented by a voltage signal VCC; the control signals comprise a clock signal CLK and a reset signal RST.

The portable data medium is represented by a chip card 2 of the credit card type.

In a preferred embodiment, the device 1 is portable and is the same size as a chip card holder, while the microprocessor 3 is also provided with a display 16 and is designed so that, once the chip card 2 is inserted into the connector of the device 1, the display 16 automatically displays an account balance located on the chip card 2, possibly in addition to other information. The device 1 can then advantageously constitute a personal balance reader which does not require any particular keying from the user.

Figure 3:
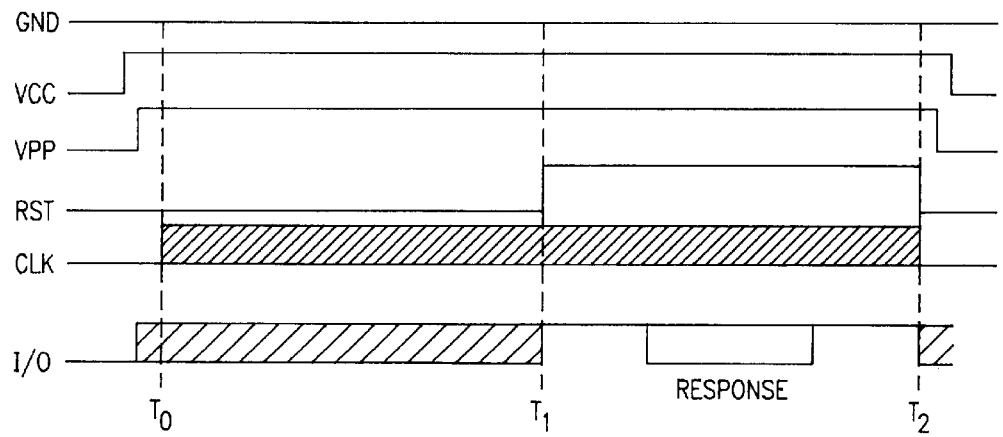
FIG. 3 is a timing chart of the signals exchanged with a chip card, in accordance with ISO standard 7816-3.

Generally, exchanges of data with a chip card are codified by ISO standard 7816, wherein part 7816-3 relates to the sequencing of the various signals applied to the chip card, namely the ground reference signal GND, the power signal VCC, the memory power signal VPP, the clock signal CLK, the reset signal RST, and the data exchange signal I/O, as shown in the timing chart in FIG. 3.

It may be seen that during the establishment of the exchange, the signals VCC, VPP, CLK and RST must be supplied in this order; the signal VPP, which is not generally used, is then short-circuited by connecting with the signal VCC. At the end of the exchange, the above-mentioned signals must disappear in the reverse order.

Figure 4:
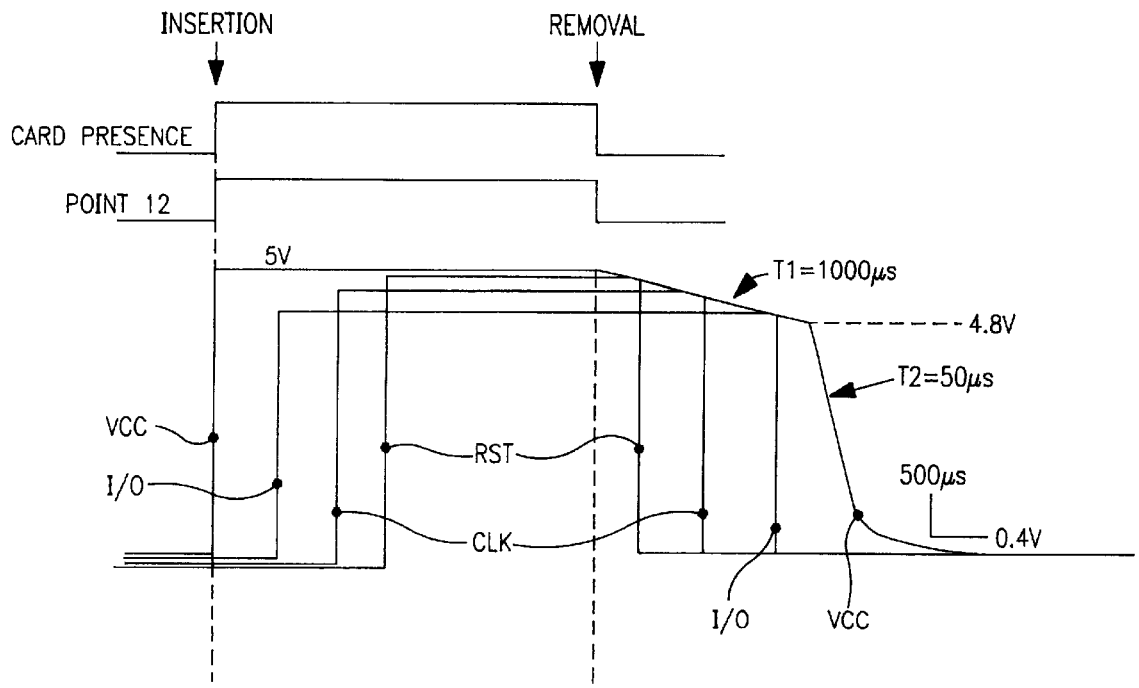
FIG. 4 is a timing chart of the signals exchanged between the device 1 according to the invention and the chip card 2 in FIG. 2.

In FIG. 4, a "card presence" curve defines the disposition of the chip card 2 relative to the device 1 (inserted or extracted), and another "point 12" curve defines the change in the voltage at point 12 in FIG. 2. Finally, a third diagram represents several overlapping curves. When the chip card 2 is inserted, the voltage signal VCC, the data transmission signal I/O, the clock signal CLK, and the reset signal RST appear in succession, and when the card is removed, these signals disappear in the reverse order.

While the sequencing of the appearance of the signals is managed by a specific program of the microprocessor, the sequencing of the disappearance of these signals also involves the electronic means in FIG. 2.

The curve of the voltage signal VCC encompasses all the other curves. When the card is removed, it decreases in two phases corresponding to two successive time constants: $\tau1=1000$ $\mu s$ and $\tau2=50$ $\mu s$, in compliance with a drop limit imposed by ISO standard 7816-3 and represented in the figure: VCC <0.4 V after 500 $\mu s$ following the card removal.

The fact that the signals I/O, RST, CLK are produced from a voltage of the microprocessor, which itself is derived from the voltage VCC supplied to the latter, guarantees that their level is always lower than that of VCC. The resistors R1, R2 make it possible, in association with the voltage regulator 6, to detect the card removal. The capacitor 8A makes it possible to continue to supply power to the chip card 2 while the signals I/O, RST, CLK are reset to zero, which occurs within the phase with the time constant $\tau1$, and the resistor 9, in association with the microprocessor, makes it possible to accelerate the decrease of VCC after this reset, in the phase with the time constant τ2.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A device (1) for communicating with a portable data medium (2) in a communication using at least a power signal (AL) supplied by an electric energy source (4), a control signal (SC1) and a data transmission signal (I/O), characterized in that it comprises:

interrupting means (5) disposed between the electric energy source and the portable data medium and controlled by the portable data medium so that the supply of the power signal (AL) to the portable data medium from the electric energy source (4) is interrupted if the portable data medium 2 is not cooperating with the device (1), and supplied if the portable data medium 2 is cooperating with the device (1);

energy storage means (8) for storing a portion of the electric energy received from the electric energy source (4), said storage means adapted to be connected to a power supply input (7) of the portable data medium (2) so as to supply the power signal AL to the portable data medium for a predetermined time following an interruption of said supply of the power signal (AL) from the electric energy source (4);

data processing means (3) for ensuring transmission of said power, control and data transmission signals (AL, SC1, I/O) to the portable data medium according to a predetermined sequencing and to interrupt said transmission according to a predetermined sequencing, as well as detecting the interruption of the supply of the power signal (AL) from the electric energy source (4), then triggering the interruption of the control and data transmission signals (SC1, I/O) according to said predetermined sequencing while the power signal (AL) is supplied from the energy storage means (8).

2. The device according to claim 1, further comprising reverse-locking means (6) disposed between the interrupting means (5) and the energy storage means (8) for preventing a return of electric energy from the energy storage means to the interrupt means (5).

3. The device according to claim 1, further comprising delivery means (9) controlled by the data processing means (3) for drawing on the energy storage means (8) once said interruption of the control and data transmission signals (SC1, I/O) according to said predetermined sequencing has been carried out.

* * * * *